(12) United States Patent
Hand et al.

(10) Patent No.: US 10,598,233 B2
(45) Date of Patent: Mar. 24, 2020

(54) OVERRUNNING COUPLING AND CONTROL ASSEMBLY AND SYSTEM TO PREVENT THE INADVERTENT ENGAGEMENT OF THE ASSEMBLY

(71) Applicants: Means Industries, Inc., Saginaw, MI (US); Toyota Jidosha Kabushiki Kaisha, Aichi-ken (JP)

(72) Inventors: Joshua D. Hand, Midland, MI (US); Hiroyuki Shioiri, Yokohama (JP)

(73) Assignees: Means Industries, Inc., Saginaw, MI (US); Toyota Jidosha Kabushiki Kaisha, Aichi-ken (JP)

( * ) Notice: Subject to any disclaimer, the term of this patent is extended or adjusted under 35 U.S.C. 154(b) by 121 days.

(21) Appl. No.: 16/029,817

(22) Filed: Jul. 9, 2018

(65) Prior Publication Data

US 2018/0340580 A1 Nov. 29, 2018

Related U.S. Application Data

(63) Continuation-in-part of application No. 15/866,620, filed on Jan. 10, 2018.

(Continued)

(51) Int. Cl.
*F16D 41/12* (2006.01)
*F16D 41/16* (2006.01)
(Continued)

(52) U.S. Cl.
CPC .................................. *F16D 41/14* (2013.01)

(58) Field of Classification Search
CPC ...... F16D 27/09; F16D 48/064; F16D 41/125; F16D 28/00; F16D 41/16;
(Continued)

(56) References Cited

U.S. PATENT DOCUMENTS 2,947,537 A 8/1960 Littell et al.
2,959,062 A 11/1960 Looker
(Continued)

FOREIGN PATENT DOCUMENTS

WO 2016168075 A1 10/2016

OTHER PUBLICATIONS

International Searching Authority, Notification of Transmittal of the International Search Report and the Written Opinion of the International Searching Authority for International Application No. PCT/US2019/040757 dated Oct. 2, 2019.
(Continued)

*Primary Examiner* — Jacob S. Scott
*Assistant Examiner* — Lillian T Nguyen
(74) *Attorney, Agent, or Firm* — Brooks Kushman P.C.

(57) ABSTRACT

Overrunning coupling and control assembly and control system for use therein are provided. The system includes a control member mounted for controlled shifting movement between the coupling faces of first of second coupling members. A one-way locking member such as a detent is pivotally connected to the control member via a selector arm for movement between a disengaged position in which the control member is permitted to shift or rotate relative to the second coupling member and an engaged position between the control member and a locking member engaging portion of the second coupling member to lock the control member and the second coupling member together to prevent the control member from inadvertently shifting in a first direction relative to the second coupling member in the absence of an actuator command signal received by a bi-directional actuator subassembly including the selector arm connected to the control member.

12 Claims, 10 Drawing Sheets

Related U.S. Application Data

(60) Provisional application No. 62/510,856, filed on May 25, 2017.

(51) Int. Cl.
*F16D 28/00* (2006.01)
*F16D 41/14* (2006.01)

(58) Field of Classification Search
CPC ......... F16D 2500/10493; F16D 41/084; F16D 2500/1022; F16D 2500/7041; F16D 2121/20
See application file for complete search history.

(56) References Cited

U.S. PATENT DOCUMENTS

| | | | |
|---|---|---|---|
| 4,050,560 A | 9/1977 | Torstenfelt | |
| 4,340,133 A | 7/1982 | Blersch | |
| 4,651,847 A | 3/1987 | Hermanns | |
| 5,927,455 A | 7/1999 | Baker et al. | |
| 6,193,038 B1 | 2/2001 | Scott et al. | |
| 6,244,965 B1 | 6/2001 | Klecker et al. | |
| 6,290,044 B1 | 9/2001 | Burgman et al. | |
| 6,607,292 B2 | 8/2003 | Gutierrez et al. | |
| 6,905,009 B2 | 6/2005 | Reed et al. | |
| 7,198,587 B2 | 4/2007 | Samie et al. | |
| 7,258,214 B2 | 8/2007 | Pawley et al. | |
| 7,275,628 B2 | 10/2007 | Pawley et al. | |
| 7,344,010 B2 | 3/2008 | Felling, Jr. et al. | |
| 7,484,605 B2 | 2/2009 | Pawley et al. | |
| 7,491,151 B2 | 2/2009 | Maguire et al. | |
| 7,643,801 B2 | 1/2010 | Piirainen | |
| 7,743,678 B2 | 6/2010 | Wittkopp et al. | |
| 7,766,790 B2 | 8/2010 | Stevenson et al. | |
| 7,942,781 B2 | 5/2011 | Kimes | |
| 7,992,695 B2 | 8/2011 | Wittkopp et al. | |
| 8,051,959 B2 | 11/2011 | Eisengruber | |
| 8,061,496 B2 | 11/2011 | Samie et al. | |
| 8,079,453 B2 | 12/2011 | Kimes | |
| 8,087,502 B2 | 1/2012 | Samie et al. | |
| 8,196,724 B2 | 6/2012 | Samie et al. | |
| 8,272,488 B2 | 9/2012 | Eisengruber et al. | |
| 8,286,772 B2 | 10/2012 | Eisengruber | |
| 8,602,187 B2 | 12/2013 | Prout | |
| 2004/0238306 A1 | 12/2004 | Reed et al. | |
| 2006/0185957 A1 | 8/2006 | Kimes et al. | |
| 2007/0034470 A1 | 2/2007 | Fetting, Jr. et al. | |
| 2007/0278061 A1 | 12/2007 | Wittkopp et al. | |
| 2008/0000747 A1 | 1/2008 | Saka | |
| 2008/0110715 A1 | 5/2008 | Pawley | |
| 2008/0169165 A1 | 7/2008 | Samie et al. | |
| 2008/0169166 A1 | 7/2008 | Wittkopp et al. | |
| 2008/0185253 A1 | 8/2008 | Kimes | |
| 2008/0223681 A1 | 9/2008 | Stevenson et al. | |
| 2009/0159391 A1 | 6/2009 | Eisengruber | |
| 2009/0194381 A1 | 8/2009 | Samie et al. | |
| 2009/0211863 A1 | 8/2009 | Kimes | |
| 2009/0255773 A1 | 10/2009 | Seufert et al. | |
| 2010/0022342 A1 | 1/2010 | Samie et al. | |
| 2010/0200358 A1 | 8/2010 | Eisengruber et al. | |
| 2010/0230226 A1 | 9/2010 | Prout | |
| 2010/0252384 A1 | 10/2010 | Eisengruber | |
| 2010/0255954 A1 | 10/2010 | Samie et al. | |
| 2011/0177900 A1 | 7/2011 | Simon | |
| 2011/0183806 A1 | 7/2011 | Wittkopp et al. | |
| 2011/0192697 A1 | 8/2011 | Prout et al. | |
| 2012/0090952 A1 | 4/2012 | Lee et al. | |
| 2012/0145505 A1 | 6/2012 | Kimes | |
| 2012/0145506 A1 | 6/2012 | Samie et al. | |
| 2012/0152683 A1 | 6/2012 | Kimes | |
| 2012/0152687 A1 | 6/2012 | Kimes et al. | |
| 2014/0102844 A1* | 4/2014 | Greene | F16D 41/12 192/45.1 |
| 2014/0190785 A1 | 7/2014 | Fetting et al. | |
| 2014/0378266 A1 | 12/2014 | Bockenstette et al. | |
| 2015/0000442 A1 | 1/2015 | Kimes et al. | |
| 2015/0001023 A1 | 1/2015 | Kimes et al. | |
| 2015/0014116 A1 | 1/2015 | Kimes et al. | |
| 2015/0105205 A1 | 4/2015 | Kurosaki et al. | |
| 2015/0211587 A1 | 7/2015 | Kimes et al. | |
| 2016/0047439 A1 | 2/2016 | Kimes et al. | |
| 2016/0129864 A1 | 5/2016 | Essenmacher | |
| 2016/0131205 A1 | 5/2016 | Essenmacher | |
| 2016/0131206 A1 | 5/2016 | Essenmacher | |
| 2016/0160941 A1 | 6/2016 | Green et al. | |
| 2016/0160942 A1 | 6/2016 | Shioiri et al. | |
| 2016/0186818 A1 | 6/2016 | Shioiri et al. | |
| 2016/0223072 A1 | 8/2016 | Miyake | |
| 2016/0230819 A1 | 8/2016 | Shioiri et al. | |
| 2016/0245346 A1 | 8/2016 | Shioiri et al. | |
| 2016/0250917 A1 | 9/2016 | Shibata et al. | |
| 2016/0265605 A1 | 9/2016 | Tomita et al. | |
| 2016/0273595 A1 | 9/2016 | Shioiri et al. | |
| 2016/0290416 A1 | 10/2016 | Hibino | |
| 2016/0339775 A1 | 11/2016 | Shioiri et al. | |
| 2016/0339908 A1 | 11/2016 | Komada et al. | |
| 2016/0341263 A1 | 11/2016 | Shioiri et al. | |
| 2016/0348742 A1 | 12/2016 | Yasui et al. | |
| 2016/0363179 A1 | 12/2016 | Yasui et al. | |
| 2016/0369855 A1 | 12/2016 | Essenmacher | |
| 2016/0375754 A1 | 12/2016 | Kurosaki et al. | |
| 2016/0377126 A1 | 12/2016 | Essenmacher | |
| 2017/0002877 A1 | 1/2017 | Shioiri et al. | |
| 2017/0037914 A1 | 2/2017 | Hibino et al. | |
| 2017/0050636 A1 | 2/2017 | Shibata et al. | |
| 2017/0059033 A1 | 3/2017 | Shioiri et al. | |
| 2017/0066317 A1 | 3/2017 | Kurosaki et al. | |
| 2018/0087585 A1 | 3/2018 | Hand et al. | |
| 2018/0149211 A1 | 5/2018 | Kurosaki et al. | |
| 2018/0340580 A1 | 11/2018 | Hand et al. | |

OTHER PUBLICATIONS

International Searching Authority, International Search Report and the Written Opinion for the International Application No. PCT/US2018/33604 dated Aug. 24, 2018.
United States Patent and Trademark Office, Non-Final Office Action for U.S. Appl. No. 15/866,620 dated Jul. 23, 2019.
The International Bureau of WIPO, International Preliminary Report on Patentability for International Application No. PCT/US2018/033604 dated Nov. 26, 2019.

* cited by examiner

OVERRUNNING COUPLING AND CONTROL ASSEMBLY AND SYSTEM TO PREVENT THE INADVERTENT ENGAGEMENT OF THE ASSEMBLY

CROSS REFERENCE TO RELATED APPLICATION

This application is a continuation-in-part application of U.S. patent application Ser. No. 15/866,620 filed Jan. 10, 2018 which claims the benefit of U.S. provisional patent application Ser. No. 62/510,856 filed May 25, 2017.

TECHNICAL FILED

This invention generally relates to overrunning coupling and control assemblies and systems to prevent the inadvertent engagement of the assemblies.

OVERVIEW

A typical one-way clutch (i.e., OWC) includes a first coupling member, a second coupling member, and a first set of locking members between opposing surfaces of the two coupling members. The one-way clutch is designed to lock in one direction and to allow free rotation in the opposite direction. Two types of one-way clutches often used in vehicular, automatic transmissions include:

Roller type which includes spring-loaded rollers between inner and outer races of the one-way clutch. (Roller type is also used without springs on some applications); and Sprag type which includes asymmetrically shaped wedges located between inner and outer races of the one-way clutch.

One-way clutches typically overrun during engine braking rather than enable engine braking. It is for this reason there is a friction pack at the same transmission node. Selectable dynamic clutches can be used to prevent the over running condition and enable engine braking.

Controllable or selectable one-way clutches (i.e., SOWCs) are a departure from traditional one-way clutch designs. SOWCs often add a second set of struts or locking members in combination with a slide plate. The additional set of locking members plus the slide plate adds multiple functions of the OWC. Depending on the needs of the design, controllable OWCs are capable of producing a mechanical connection between rotating or stationary shafts in one or both directions. Also, depending on the design, OWCs are capable of overrunning in one or both directions. A controllable OWC contains an externally controlled selection or actuation mechanism. Movement of this selection mechanism can be between two or more positions which correspond to different operating modes. The selection mechanism is a separate system or assembly that is fixed relative to the OWC by same fastening technique. Such selective mechanism is fixed in a separate and subsequent operation after the OWC has been formed. That subsequent operation requires an additional work station, be it automated or otherwise, which increases, in particular, the manufacturing time and cost of the finished assembly.

In addition, the fact that separate, external parts may be mounted on or near the OWC in a source of quality defects and thus adds to the cost of making such controllable of selectable OWCs which may be significant on a mass production basis. Also, due to dimensional stack-up issues control element or selector plate binding can result especially over long term use.

Driven by a growing demand by industry, governmental regulatory agencies and consumers for durable and inexpensive products that are functionally comparable or superior to prior art products, a continuing need exists for improvement in clutches subjected to difficult service conditions such as extreme temperatures. This is particularly true in the automotive industry where developers and manufactures of clutches for automotive applications must meet a number of competing performance specifications for such articles.

Another problem associated with prior art coupling and control assemblies is that is undesirable to have a relatively large distance between the control element and the activator which moves the control element. A large distance reduces the amount of available space in which the assembly is located. For example, in a vehicle, the amount of space for such assemblies is typically quite limited.

U.S. Pat. No. 5,927,455 discloses a bi-directional overrunning pawl-type clutch. U.S. Pat. No. 6,244,965 discloses a plannar overrunning coupling for transfer of torque. U.S. Pat. No. 6,290,044 discloses a selectable one-way clutch assembly for use in an automatic transmission. U.S. Pat. No. 7,258,214 discloses an overrunning coupling assembly. U.S. Pat. No. 7,344,010 discloses an overrunning coupling assembly. U.S. Pat. No. 7,484,605 discloses an overrunning radial coupling assembly or clutch.

Other related U.S. Patent publications include 2012/0145506; 2011/0192697; 2011/0183806; 2010/0252384; 2009/0194381; 2008/0223681; 2008/0169165; 2008/0169166; 2008/0185253; and the following U.S. Pat. Nos. 8,079,453; 7,992,695; 8,051,959; 7,766,790; 7,743,678; and 7,491,151.

One problem associated with such controllable one-way coupling assemblies is that the one-way clutch may inadvertently change (such as due to parasitic losses) from its overrun position or mode to its locked position or mode especially when the ambient temperature is well below 0° F. due to the highly viscous hydraulic fluid in the one-way clutch. Such a change could cause the clutch to fail.

U.S. Pat. No. 8,272,488 discloses an overrunning coupling and control assemblies, each of which includes control apparatus having a latching mechanism. Each latching mechanism of an overrunning coupling assembly in a first direction substantially parallel to a shift direction of a control plate of the coupling assembly within a housing slot in a locked condition of the mechanism in a first position of the control plate. A control pressure signal within a bore of the housing changes the condition of the latching mechanism from locked to unlocked to unlock the actuator arm and causes the unlocked actuator are to move along the first direction within the slot and the control element to move along the shift direction to a second position. The control pressure signal also causes a piston which has a groove formed in its outer surface to receive and retain a free end portion of the actuator arm to slide within the bore in the housing against the biasing force of the at least one biasing member. In the absence of a control pressure signal, the at least one biasing member moves the piston and thereby the unlocked actuator arm in a second direction opposite the first direction within the slot and the control element along the shift direction from the second position back to the first position and changes the condition of the latching mechanism from unlocked to locked to lock the actuator arm.

U.S. Published Patent application 2016/0160942; 2016/0273595; 2016/0290416; 2016/0339775; 2016/0341263; 2016/0348742; 2016/0375754; 2017/0002877; and 2017/0059033 all discuss the problem of "drag torque" in selectable one-way clutches (i.e. SOWCs).

In one selectable one-way clutch, the pocket plate is fixed to a stationary member, and lubrication oil is applied between the rotary plates. However, the selector plate may be rotated undesirably by a rotation of the notch plate through the lubrication oil. Especially, such drag torque delivered from a shearing force of the oil that is applied to the selector plate is increased with an increase in viscosity of the oil. For example, if a temperature of the oil is extremely low, viscosity of the oil is increased significantly. In this situation, the selector plate may be rotated by the drag torque resulting from rotating the notch plate, and as a result, an actuator arm may be actuated to bring the notch plate into engagement undesirably with the pocket plate. Such erroneous engagement of the selectable one-way clutch may be prevented by enhancing an elastic force of a return spring counteracting the drag torque. In this case, however, a larger actuator for rotating the selector plate may be required to overcome the enhanced spring force, and, consequently, the selectable one-way clutch is enlarged.

Other related SOWCs are described in the following published U.S. Patent applications: 2015/0105205; 2016/0186818; 2016/0230819; 2016/0223072; 2016/0245346; 2016/0250917; 2016/0265605; 2016/0339908; 2016/0363179; 2017/0037914; 2017/0073759; 2017/0050636; and 2017/0066317.

Other U.S. Patent publications which disclose controllable or selectable one-way clutches include U.S. Pat. Nos. 6,193,038; 7,198,587; 7,275,628; 8,087,502; 8,196,724; 8,602,187; and 7,464,801; and U.S. Publication Application Nos: 2007/0278061; 2008/0000747; 2008/0110715; 2009/0159391; 2009/0211863; 2010/0230226; 2014/0190785; 2014/0378266; 2016/0129864; 2016/0160941; 2016/0131206; 2016/0131205; 2016/0369855; and 2016/0377126.

Despite the above, a need exists to provide non-hydraulic clutch disengagement under load, especially during extremely low startup temperature (i.e. 0.0° F. or lower) while conserving space in an automatic transmission environment.

Other U.S. Patent documents related to the present application include: U.S. Pat. Nos. 2,947,537; 2,959,062; 4,050,560; 4,340,133; 4,651,847; 6,607,292; 6,905,009; 7,942,781; 8,061,496; 8,286,772; 2004/0238306; 2006/0185957; 2007/0034470; 2009/0255773; 2010/0022342; 2010/0255954; 2011/0177900; 2012/0090952; 2012/0152683; 2012/0152687; 2012/0145505; 2012/0152687; 2012/0152683; 2015/0001023; 2015/0000442; 2015/0014116; 2015/0211587; and 2016/0047439.

For purposes of this application, the term "coupling" should be interpreted to include clutches or brakes wherein one of the plates is drivably connected to a torque delivery element of a transmission and the other plate is anchored and held stationary with respect to a transmission housing. The terms "coupling", "clutch" and "brake" may be used interchangeably.

SUMMARY

An object of at least one embodiment of the present invention is to provide an overrunning coupling and control assembly and control system for use therein wherein a mechanism is provided to prevent inadvertent engagement of the assembly especially at cold operating temperatures.

In carrying out the above object and other objects of at least one embodiment of the present invention, a system for controlling the operating mode of an overrunning coupling assembly including first and second coupling members having first and second coupling faces, respectively, in close-spaced opposition with one another is provided. The first coupling member is mounted for rotation about a rotary axis. The system includes a control member mounted for controlled shifting movement between the coupling faces. A bi-directional actuator assembly includes an output member pivotally connected to the control member for selective, small-displacement, control member shifting movement relative to the second coupling member between a first position which corresponds to a first operating mode of the coupling assembly and a second position which corresponds to a second operating mode of the coupling assembly in response to an actuator command signal. A one-way locking member is connected to the output member for movement between a disengaged position in which the control member is permitted to shift relative to the second coupling member and an engaged position between the control member and a locking member-engaging portion of the second coupling member to lock the control member and the second coupling member together to prevent the control member from inadvertently shifting in a first direction relative to the second coupling member in the absence of the actuator command signal received by the actuator assembly.

The control member may be a control or selector plate rotatable about the axis between different angular positions.

The output member may include an actuator arm.

The coupling assembly may be a clutch assembly, the coupling members may be clutch members and the coupling faces may be clutch faces.

The system may be an electromechanical system wherein the actuator assembly may include an electrically-powered device for driving the control member in response to an electrical actuator command signal.

The locking member may be integrally formed with the output member.

The locking member and the output member may be rotatably connected to the control member via a clearance fit connection.

The output member may extend through a slot formed in a wall of the second coupling member wherein the locking member-engaging portion at least partially defines the slot.

The clutch assembly may be selectable, one-way clutch assembly wherein the first clutch member may be a notch plate, the second clutch member may be a pocket plate and the control member may be a selector plate rotatable about the axis.

The control member may have a slot formed therein and the output member may have pair of spaced legs projecting therefrom. The legs may have the clearance fit connection with the slot in the control member so that the legs rotate within the control member.

Further in carrying out the above object and other objects of at least one embodiment of the present invention, an overrunning coupling and control assembly is provided. The assembly includes a coupling subassembly including first and second coupling members having first and second coupling faces, respectively, in close-spaced opposition with one another. The first coupling member is mounted for rotation about a rotary axis and the second coupling member includes a pawl-engaging portion. A control member is mounted for controlled shifting movement between the coupling faces. A bi-directional actuator subassembly includes an output member pivotally connected to the control member for selective, small-displacement, control member shifting movement relative to the second coupling member between a first position which corresponds to a first operating mode of the coupling subassembly and a second position which corresponds to a second operating mode of the coupling subassembly in response to an actuator command signal. A one-way locking member is connected to the output member for movement between a disengaged position in which the control member is permitted to shift relative to the second coupling member and an engaged position between the control member and the locking member-engaging portion of the second coupling member to lock the control member and the second coupling member together to prevent the control member from inadvertently shifting in a first direction relative to the second coupling member in the absence of the actuator command signal received by the actuator subassembly.

The control member maybe a control or selector plate rotatable about the axis between different angular positions.

The output member may include an actuator arm.

The coupling subassembly may be a clutch subassembly, the coupling members may be clutch members and the coupling faces may be clutch faces.

The actuator subassembly may include an electrically-powered device for driving the control member in response to an electrical actuator command signal.

The locking member may be integrally formed with the output member.

The locking member and the output member may be pivotally connected to the control member via a clearance fit connection.

The output member may extend through a slot formed in a wall of the second coupling member wherein the locking member-engaging portion may at least partially define the slot.

The clutch subassembly may a selectable, one-way clutch subassembly wherein the first clutch member may be a notch plate, the second clutch member maybe a pocket plate and the control member may be a selector plate rotatable about the axis.

The control member may have a slot formed therein and the output member may have a pair of spaced legs projecting therefrom. The legs may have the clearance fit connection with the slot in the control member so that the legs rotate within the control member.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

An overrunning coupling and control assembly typically includes a coupling subassembly such as a selectable one-way clutch (SOWC) subassembly. The subassembly includes first and second coupling members having first and second coupling faces, respectively, in closed-spaced opposition with one another.

Figure 1:
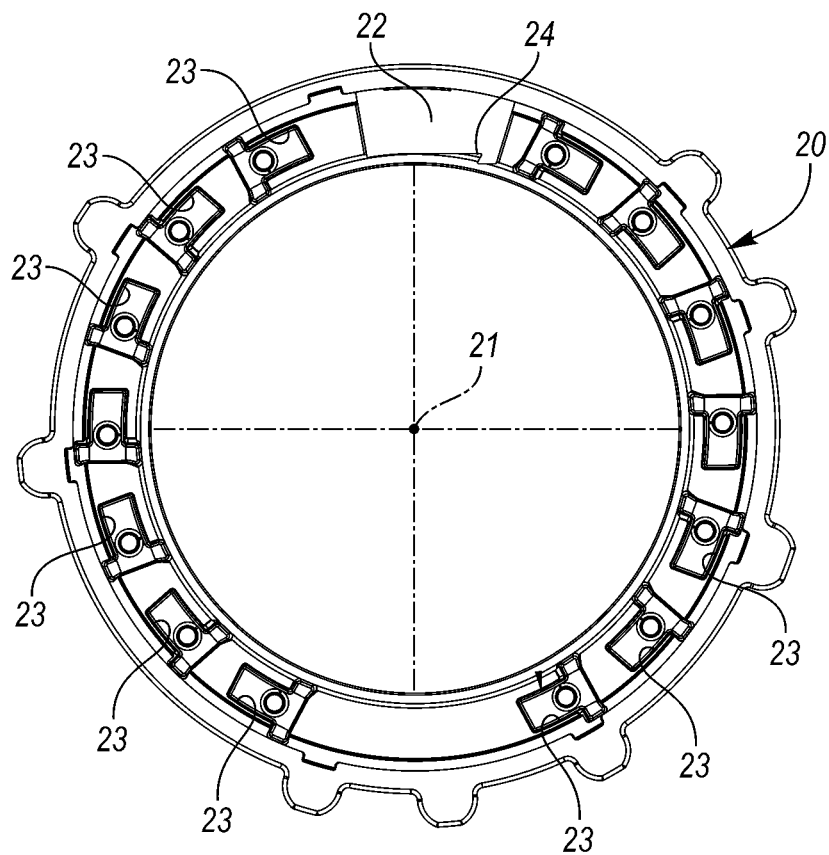
FIG. 1 is a top plan view of a pocket plate having pockets for locking struts.

As shown in FIG. 1, the first coupling member may be a notch plate (not shown) which is mounted for rotation about a rotary axis 21 of the subassembly and the second coupling member may be a pocket plate, generally indicated at 20, which is stationary relative to the notch plate. The pocket plate 20 has a coupling face 22 with pockets 23.

Figure 2:
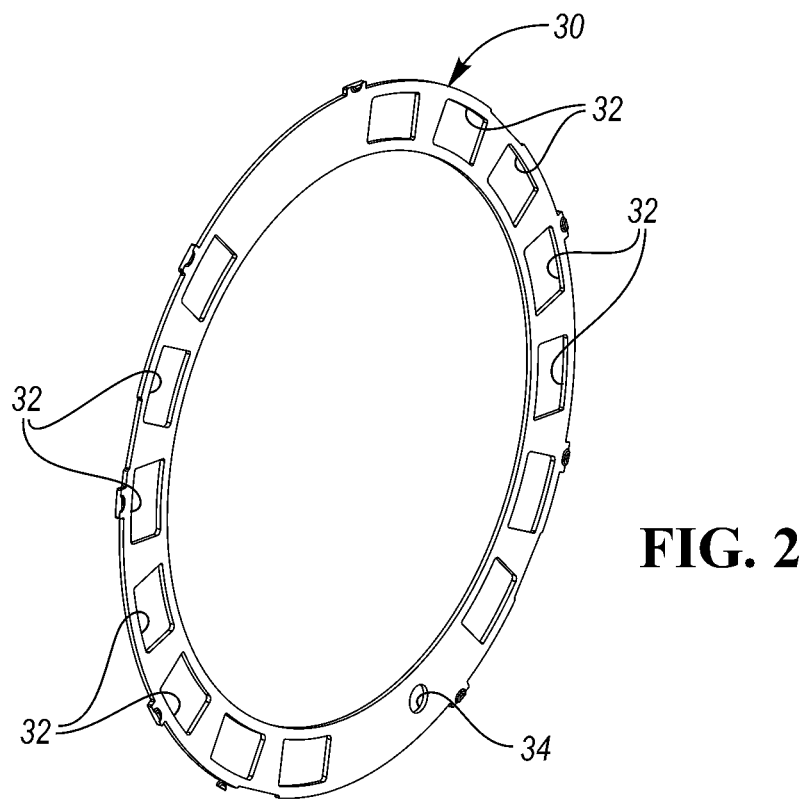
FIG. 2 is a perspective view of a selector plate or control member for use in a coupling and control assembly constructed in accordance with at least one embodiment of the present invention.
Figure 3:
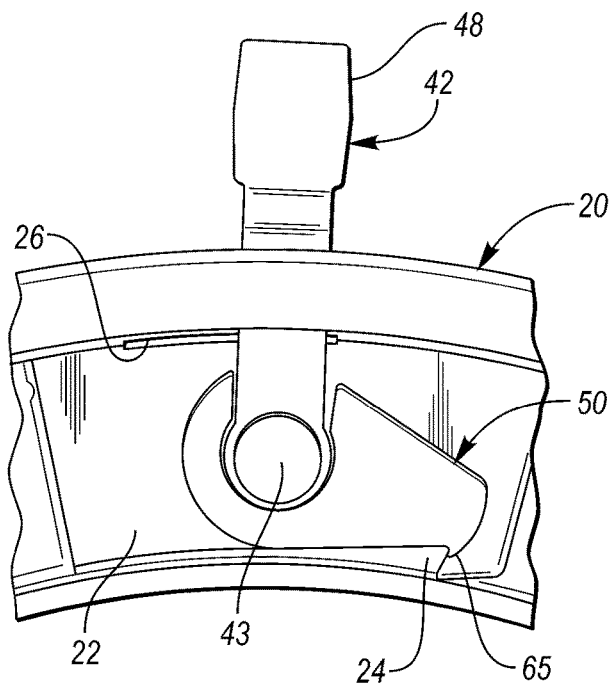
FIG. 3 is a side elevational view, partially broken away, showing the interconnection between a two-piece actuator arm and spring-biased locking member or pawl and the pocket plate of FIG. 1.

As shown in FIG. 2, the SOWC subassembly also typically includes a control member or selector plate, generally indicated at 30 in the first embodiment of the invention, (not shown for the second embodiment) and 30" in the third embodiment, mounted for controlled shifting or rotational movement between the coupling faces of the notch and pocket plates. The selector plate 30 includes a plurality of spaced apertures 32 to allow locking members or struts to extend therethrough. The selector plate 30 also includes a hole 34 which extends therethrough to allow a slip-fit pivotal connection with an actuator arm and a one-way locking member or pawl as described hereinbelow.

Figures 4, 5:
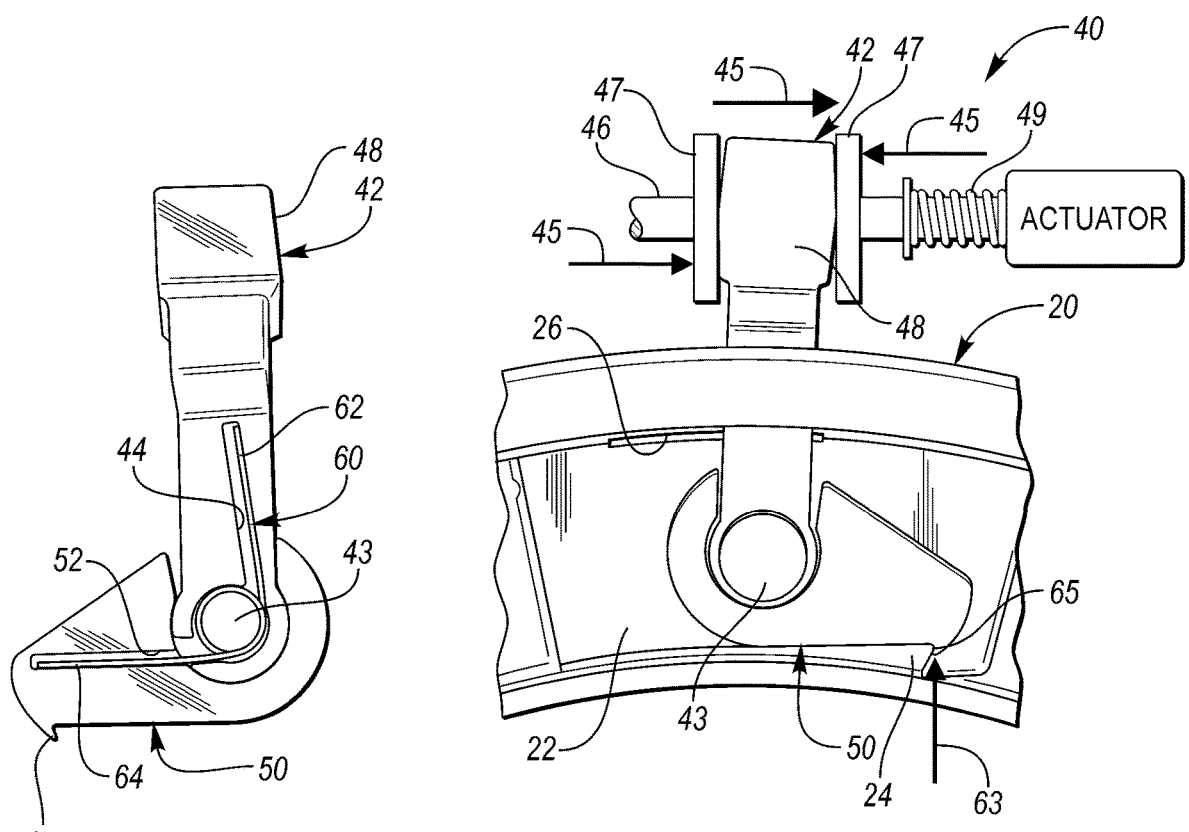
FIG. 4 is a back view of the two-piece actuator arm and spring-biased pawl of FIG. 3.
FIG. 5 is a view, similar to the view of FIG. 3, but also showing an actuator assembly and forces or loads represented by arrows.
Figure 6:
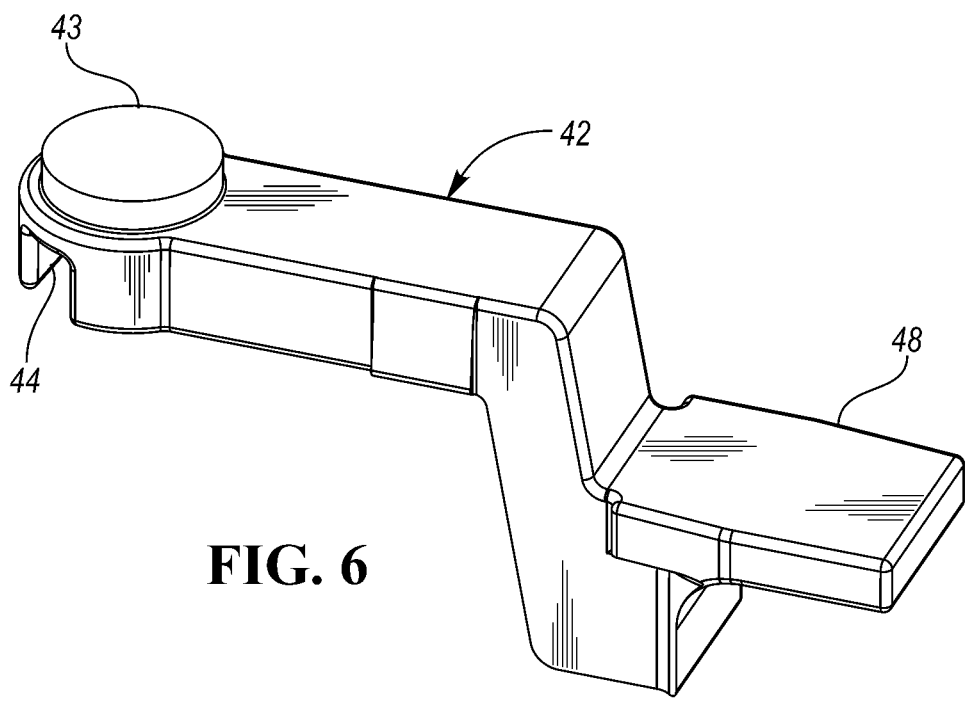
FIG. 6 is a top perspective view of the actuator arm of FIGS. 3-5.
Figure 7:
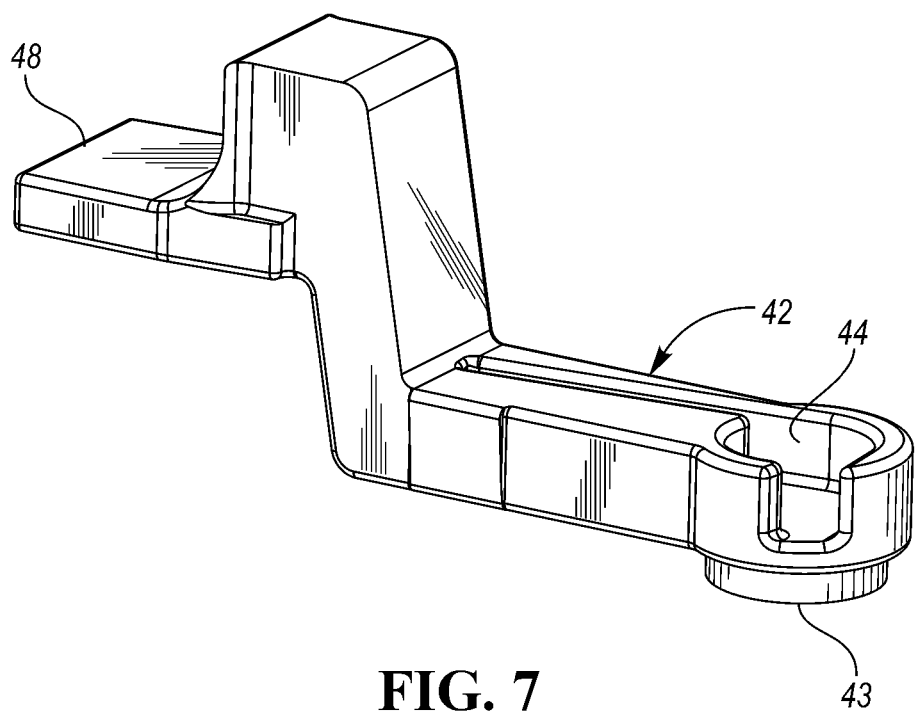
FIG. 7 is a perspective view, similar to the view of FIG. 6, but from a reverse direction.
Figure 8:
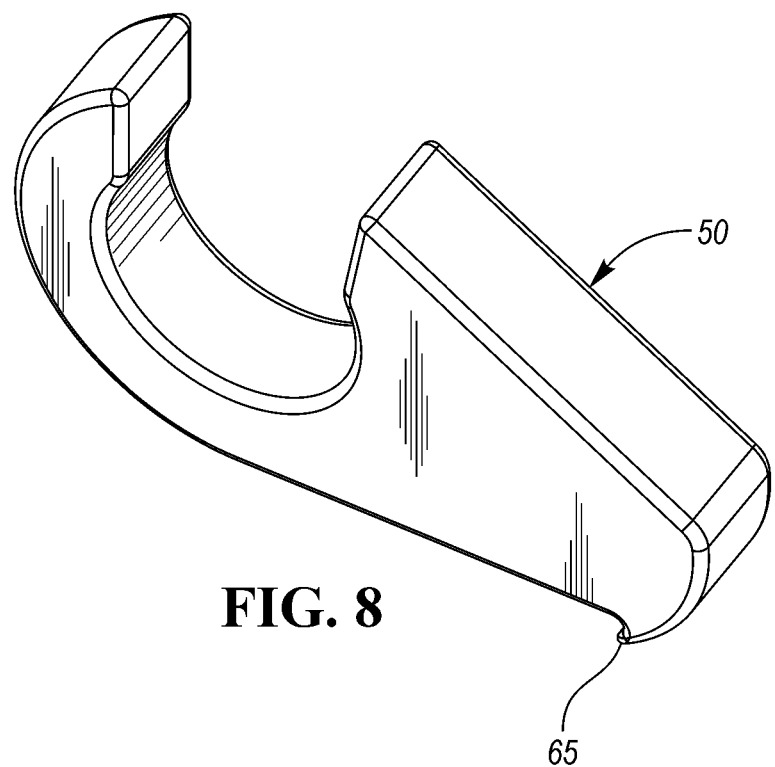
FIG. 8 is a top perspective of the pawl of FIGS. 3-5.
Figure 9:
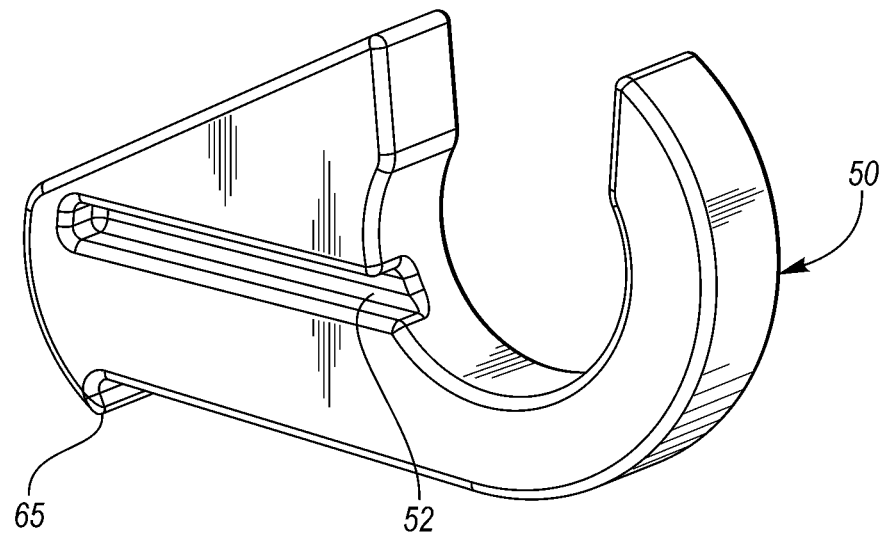
FIG. 9 is a perspective view, similar to the view of FIG. 8, but from a reverse direction.
Figure 11:
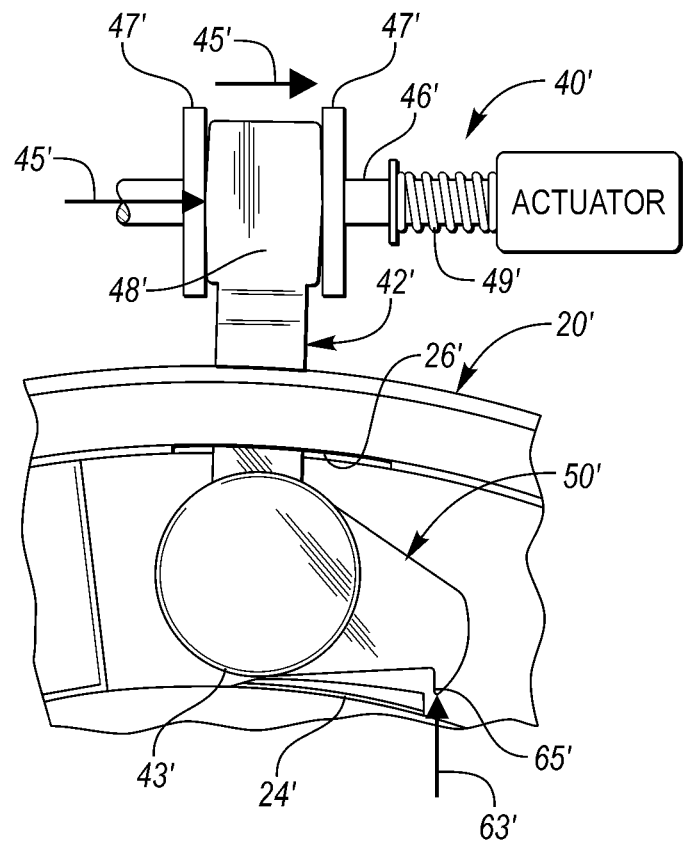
FIG. 11 is a view, similar to the view of FIG. 5, but showing the one-piece design of FIG. 10.

Referring to FIGS. 5 and 11, the coupling and control assembly also includes a bi-directional actuator subassembly, generally indicated at 40 (40' in FIG. 11), including an output member or actuator arm (42 in the first embodiment, 42' in the second embodiment and 42" in the third embodiment) pivotally connected to the selector plate 30 via a pivot pin 43 and connected to an armature or plunger 46 of an actuator or solenoid by collars 47 on opposite sides of a head portion 48 of the arm 42. (Opposite side surfaces of the head portion 48 are angled to provide the proper motion of the output member 42 and the locking member 50 during linear movement of the armature 46).

A biasing spring 49 biases the armature 46 for selective, small-displacement, control member shifting or pivotal movement relative to the pocket plate 20 between a first position which corresponds to a first operating mode of the coupling subassembly and a second position which corresponds to a second operating mode of the coupling subassembly in response to an actuator command signal received by the actuator of the subassembly 40.

Figure 12:
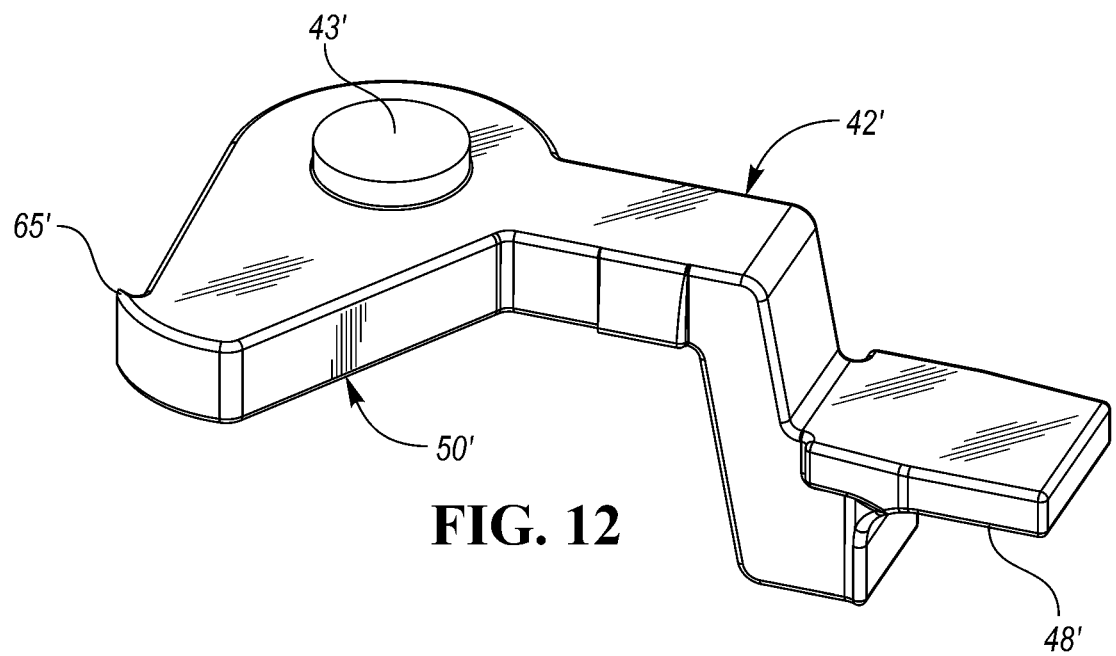
FIG. 12 is a perspective view, similar to the view of FIG. 6, but of the one-piece design.
Figure 13:
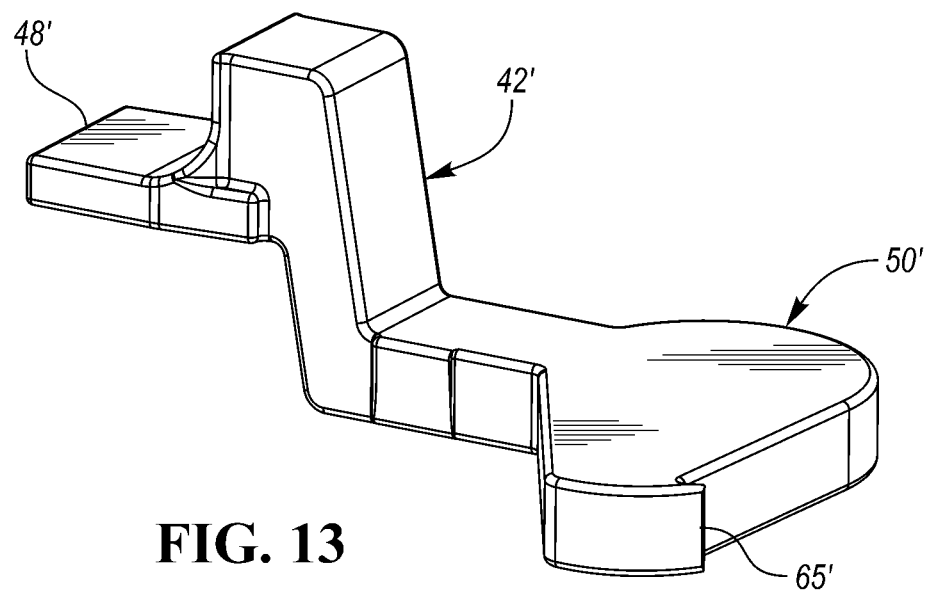
FIG. 13 is a perspective view, similar to the view of FIG. 7, but of the one-piece design.

The coupling and control assembly also includes a one-way locking member or a pawl (50 in the first embodiment of FIGS. 3-5, 8 and 9; 50' in the second embodiment of FIGS. 12 and 13; and 50" in the third embodiment of FIGS. 14-18). The pawl 50 is also pivotally connected to the selector plate 30 via the pin 43 (which extends into the hole 34) for movement between a disengaged position in which the selector plate 30 is permitted to shift or rotate relative to the pocket plate 20 and an engaged position between the selector plate 30 and a locking member engaging portion 24 of the pocket plate 20 to lock the selector plate 30 and the pocket plate 20 together to prevent the selector plate 30 from inadvertently shifting or rotating in a first direction about the axis 21 relative to the pocket plate 20 in the absence of the actuator command signal received by the actuator of the subassembly 40.

The assembly may further comprise one or more locking members or struts (not shown) disposed between the coupling faces of the coupling members and moveable between the first and second positions. Shifting movement of the selector plate 30 causes the locking member to change position. The selector plate 30 has at least one opening, and preferably, a plurality of the openings 32, which extends completely therethrough and through which the locking struts extend between the notch and pocket plates.

The actuator of the actuator subassembly 40 may be an electrically-powered device such as a solenoid for driving the selector plate 30 in response to an electrical actuator command signal from a controller (not shown) which, in turn, may be electrically coupled to a TECU of a vehicle. The solenoid provides a substantially equally distributed load or force as indicated by the arrows 45 in FIG. 5 during covering of the struts by the selector plate 30.

The assembly of the first embodiment may further comprise a biasing member such as a torsion spring, generally indicated at 60, which exerts a biasing force on the pawl 50 to bias the pawl 50 into an engaged position with the pawl-engaging portion 24. The pawl 50 and the arm or output member 42 are pivotally connected together. One end 62 of the spring 60 is positioned in an elongated slot 44 formed in the back surface of the arm 42 and a second end 64 of the spring 60 is positioned in an elongated slot 52 (FIG. 9) formed in the back surface of the pawl 50. The load or force (indicated by arrow 63) of the spring 60 is provided between the arm 42 and a free end or locking portion 65 of the pawl 50 during covering of the struts by the selector plate 30. In this way, the pawl 50 is spring-biased into the engaged position with the pawl-engaging portion 24 which is integrally formed on the face 22 of the pocket plate 20.

In the second embodiment, a locking member or pawl 50' is integrally formed with an arm or output member 42' as shown in FIGS. 10-13 (first embodiment shown in FIGS. 3-9).

The locking member 50, 50' or 50" and the output member 42, 42' or 42" may both be pivotally connected to the control member 30 or 30" via a slip fit connection provided by the pivot pin (43, 43' or 43") which extends into and is retained within the hole 34 or 34" of the selector plate 30 or 30" to allow the pivotal motion.

The actuator arm or output member 42, 42' or 42" extends through a slot 26, 26' or 26" formed in its respective cylindrical wall 28, 28' or 28" of the pocket plate 20, 20' or 20". In the third embodiment of FIGS. 14-18, the locking member engaging portion 24" of the pocket plate 20" at least partially defines the slot 26".

The pawl-engaging portion 24 is integrally formed on the second coupling face 22 of the pocket plate 20 in the first embodiment and the pawl-engaging portion 24' is integrally formed on the second coupling face 22' of the pocket plate 20' in the second embodiment.

The solenoid of the actuator subassemblies 40 and 40' typically have the armatures 46 and 46', respectively, configured to linearly move between extended and retracted positions wherein the output members 42 and 42' are connected to their respective armatures 46 and 46' so that the output members 42 and 42' are allowed to rotate a predetermined amount before the output members 42 and 42' begin to shift their respective selector plates 30 and 30'.

The actuation systems 40 and 40' may be either hydraulic or electric systems. Each actuation system can be forced to a selector plate "open" orientation if forces get high. These high forces can be from cold oil drag during notch plate rotation. At least one embodiment of the invention creates a lock so that when the actuator is in its "struts-covered" position, a force generated at the selector plate cannot disengage the lock. The lock can only be disengaged by the actuator when commanded to go into its "struts-covered" position.

During cold temperature notch plate rotation, forces are generated at the selector plate causing the return spring 49 or 49' of the actuation system to be overcome and the struts to be uncovered by selector plate movement. This would cause an engagement of the struts with the notch plate when the actuator was not commanded to uncover the struts. This invention prevents this from occurring. Without this invention, the actuation system would have to be built stronger to prevent the selector plate 30, 30' or 30" from moving or shifting when not commanded, or the clutch would have to be designed so that less unintended force would be generated.

In general, the first embodiment of FIGS. 3-9, there is disclosed, a two-piece actuator arm, one member is connected to the actuator armature and solenoid (called the actuator arm), and one member connected to the actuator arm that acts as the locking member (called locking member or pawl). These two members are connected to each other and are allowed to pivot relative to each other. The actuator arm is designed to rotate to a fixed location during both the "on" and "off" states and can freely rotate within the selector plate. There is a torsional spring between the actuator arm and the pawl so that the pawl can be forced into the lock position. The pocket plate has a small ledge or portion to interface with the pawl to allow the locking action to occur. When the actuator commands the struts to be uncovered, the actuator armature begins to move which makes the actuator arm rotate to its allowable rotation allowing the pawl to be lifted from the locked position. Once the pawl is lifted from its locked position the actuator arm moves tangentially and uncovers the struts.

Figure 10:
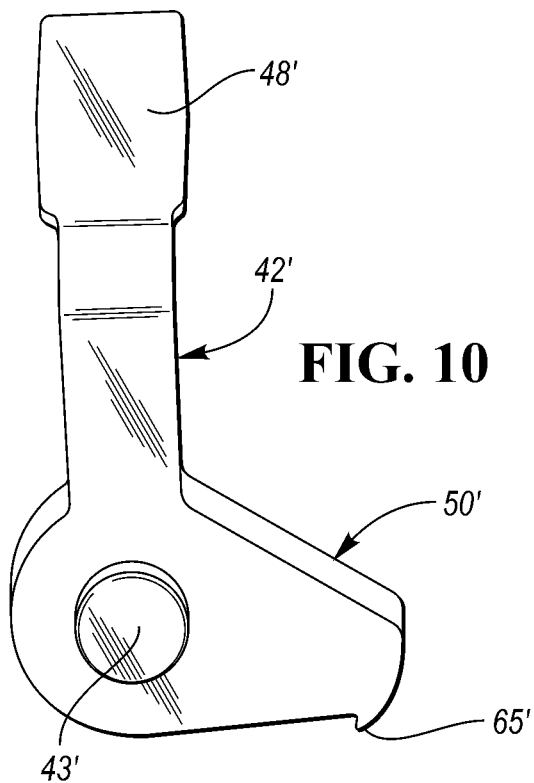
FIG. 10 is a front view of an actuator arm and locking member or pawl formed as a single piece.

In general, the second embodiment of FIGS. 10-12 is similar to the first embodiment except the actuator arm and pawl are a solid, one-piece design. This simplifies the function and assembly of the parts. This design functions very similar to that of the first design, but the load path during the actuator off/strut covered action can cause binding and wear issues. If the conditions exist that a solid one-piece actuator arm can be used, money can be saved from part and assembly cost.

In general, the third embodiment of FIGS. 14-18 utilizes a one-piece actuator arm and locking member or pawl and can freely rotate between its connection to its selector plate. This design differentiates from the first two designs since the direction of actuation is reversed. The actuator arm pivots about the pocket plate so that when the actuation system commands a movement, the opposite side of the actuator moves in the opposite direction of the actuation system. This design works since the unintended force from the selector plate pushes in the opposite direction of the actuation. When the force comes from the selector plate (from drag) the selector pushed on the actuator arm which locks into the pocket plate when a small return spring is used to push on the actuator arm in the lock direction.

Figure 14:
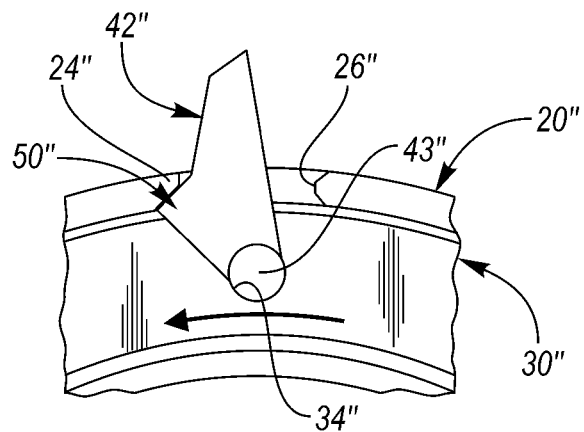
FIGS. 14-18 are side schematic views, partially broken away, of a one-piece actuator arm and locking member, a selector plate and a pocket plate wherein the direction of actuation is reversed with respect to the previous embodiments.

FIG. 14 shows the struts covered and the solenoid "off". A small spring force keeps the actuator arm from disengaging from a lock condition.

Figure 15:
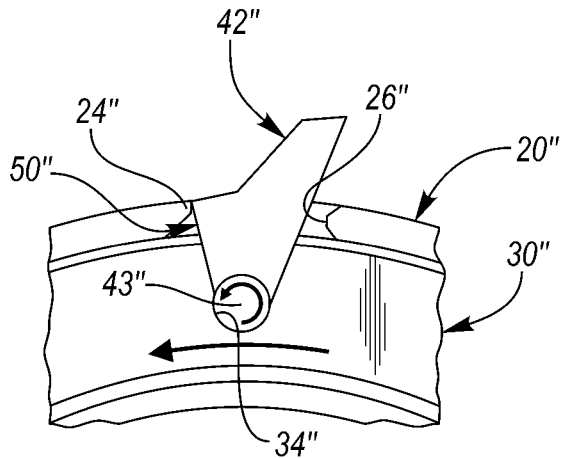
Figure 16:
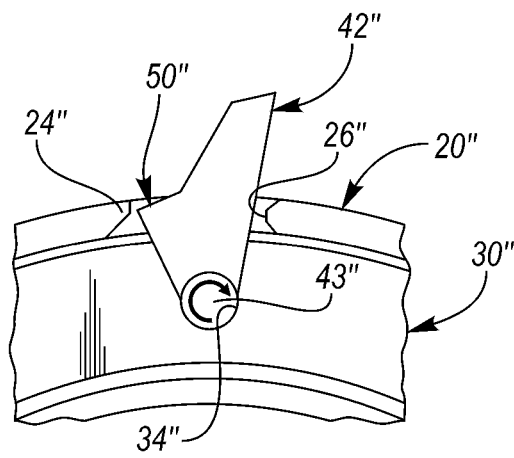
Figure 17:
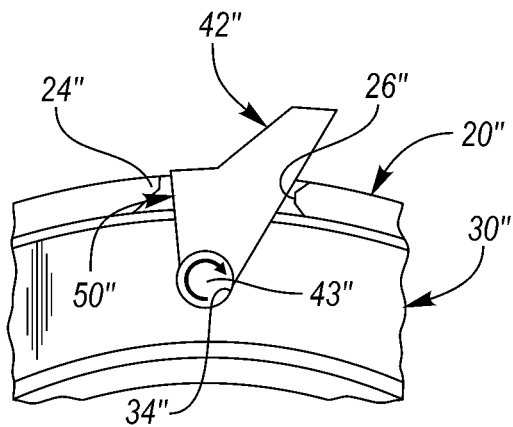
Figure 18:
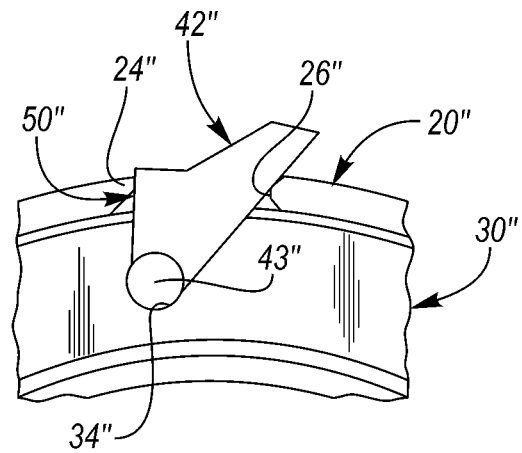
Figure 19:
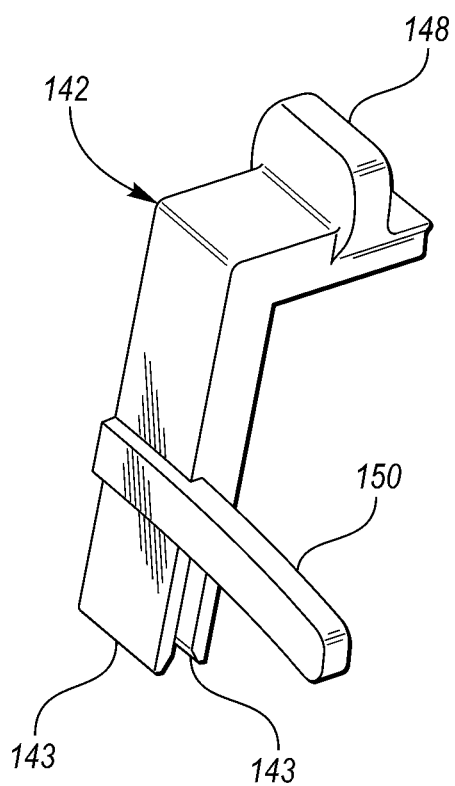
FIG. 19 is a top perspective view of a one-piece actuator arm and locking member or detent constructed in accordance with at least one embodiment of the present invention.
Figure 20:
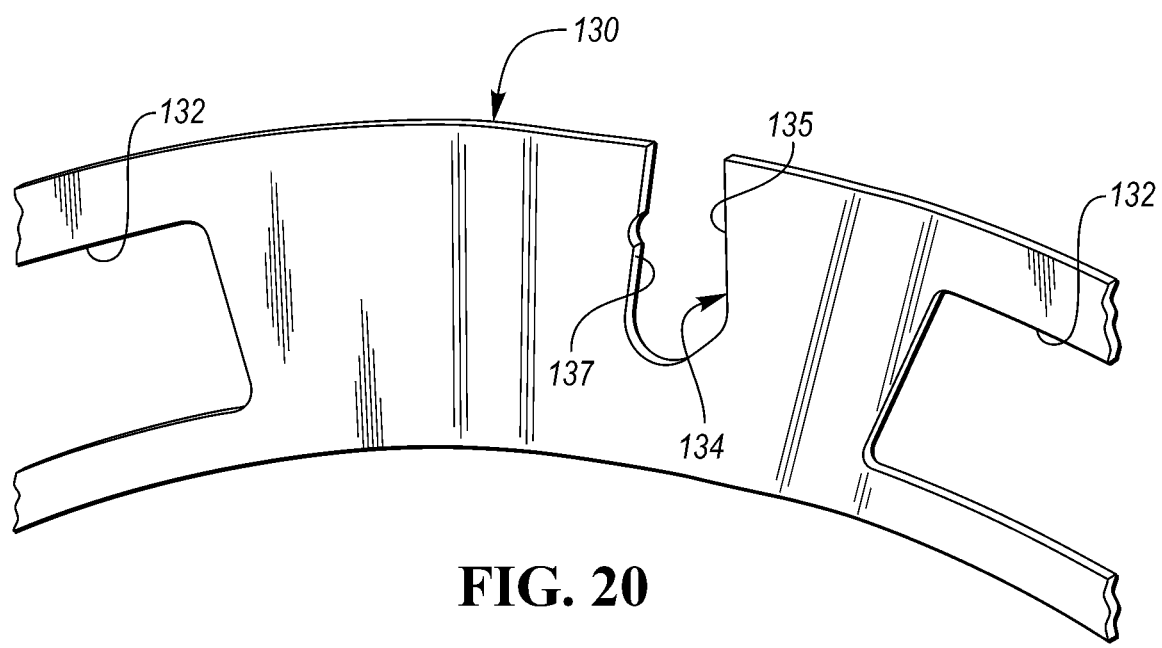
FIG. 20 is a top perspective view, partially broken away, of a control member or selector plate for use with the mechanism of FIG. 19.

FIG. 15 shows the struts covering, solenoid "off".
FIG. 16 shows the struts uncovering, solenoid "on".
FIG. 17 shows the struts uncovering, solenoid "on".
FIG. 18 shows the struts uncovered, solenoid "on".

In at least one of the above-noted embodiments (i.e. the first and second), the angle on the actuator arm that interfaces with the solenoid armature is designed so that the actuator arm can rotate a specific amount before the actuator arms begins to move the selector plate. When uncovering the struts, the rotation of the actuator arm allows the locking feature to clear the lock feature on the pocket plate. When covering the struts in the first embodiment, the rotation of the actuator arm allows to compress the small torsion spring (and keep forces low to prevent wear) so when the selector plate is completely covered, the lock can occur. The above-noted angles are relatively important and without them the lock may not function properly.

Referring now to FIGS. 19-24 there is illustrated yet another embodiment of a system and assembly to prevent inadvertent engagement of the assembly; in other words, to prevent uncommanded control member or selector plate movement which, in turn, changes the operating mode of the assembly in an undesirable fashion especially at low temperature. As in the prior embodiments, a lock is created which is disengaged when a bi-directional actuator assembly, generally indicated at 140, receives an actuator command signal.

Still referring to FIGS. 19-24, this embodiment is similar to the one-piece design of FIGS. 10-13 but rotation of the actuator arm or output member, generally indicated at 142, is dictated by the connection or clearance fit from the actuator arm 142 into a selector plate, generally indicated at 130. (The embodiment of FIGS. 19-24 has the same reference number at the prior embodiments but the number "100" has been added to the prior reference numbers to aid the reader.)

Figure 21:
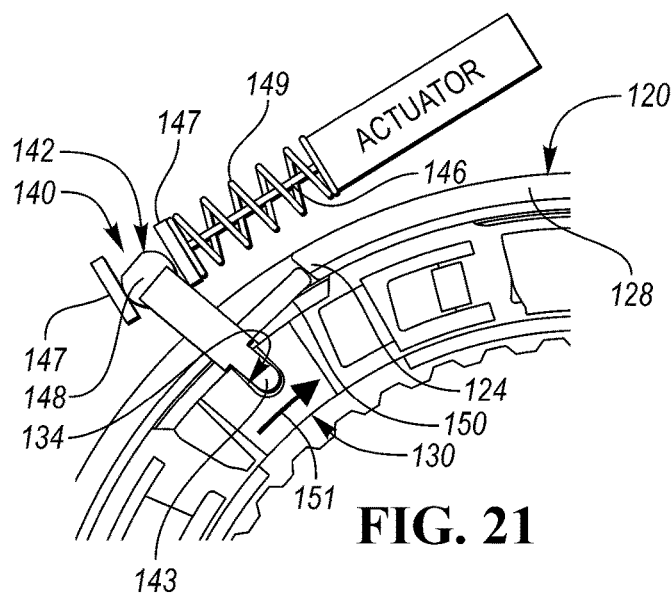
FIGS. 21 through 23 are side views, partially broken away, of a system and assembly for preventing inadvertent control member or selector phase movement utilizing the devices of FIGS. 19 and 20 and showing different operative positions of the locking member or detent.

In the embodiment of FIGS. 19-24, when the selector plate 130 gets forced to open by drag forces and not an actuation command signal received by an actuator (FIGS. 21 and 22) of the actuator assembly 140, a one-way locking member or detent 150 integrally formed with the actuator arm 142 rotates and contacts a coupling member or pocket plate, generally indicated at 120, thereby preventing further rotation of the selector plate 130 (i.e. FIG. 21).

Figure 23:
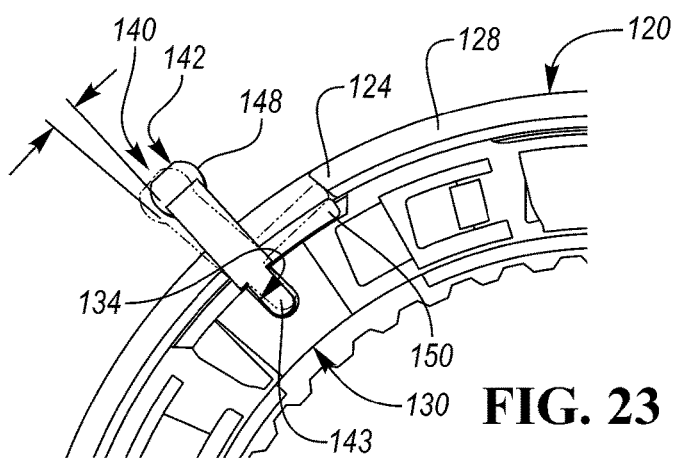

The selector plate 130 includes a slot, generally indicated at 134, which receives a pair of spaced legs 143 of the actuator arm 142 is defined by a straight side or edge 135 and an angled side or edge 137 so that the actuator arm 142 can rotate through fixed angle in one direction as shown in FIG. 23.

As in the first two embodiments of FIGS. 1-13, the actuator arm 142 includes a head portion 148 which is received and retained between collars 147 (FIGS. 21 and 22) which are mounted for linear movement on an armature or plunger 146 of the actuator. The actuator assembly 140 also includes a biasing member or return spring 149 which closes the selector plate 130 in the extended position of the plunger 146 (i.e. in the absence of a command signal to the actuator). FIG. 21 shows a spring force on the selector plate 130 by arrow 151.

Figure 22:
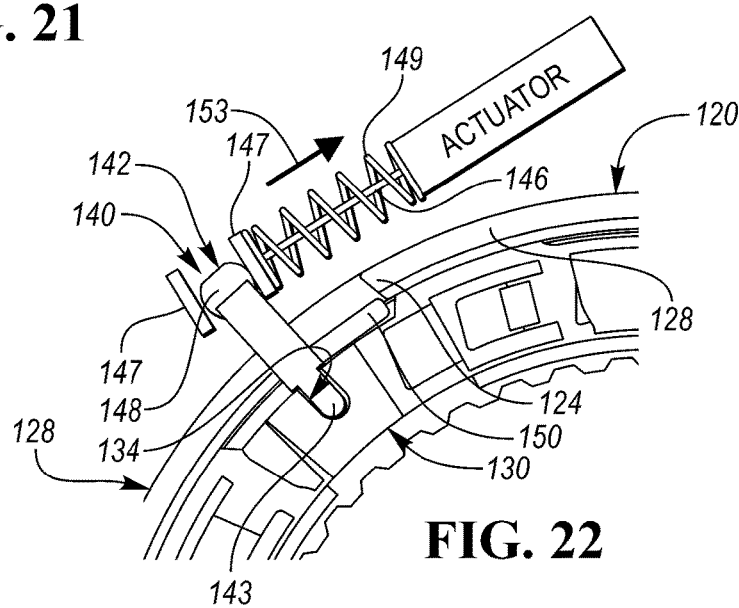

When the actuator receives a command signal the plunger 146 is retracted against the biasing action of the return spring 149 as indicated by force arrow 153 in FIG. 22.

As in the prior embodiments, the actuator arm or output member 142 extends through a slot 126 formed in a wall 128 of the pocket plate 120. The detent or locking member 150 engages a portion 124 of the wall 128 to lock the selector plate 130 and the pocket plate 120 together to prevent the selector plate 130 from inadvertently shifting or rotating in the absence of an actuator command signal.

Preferably, the actuator, as in the other embodiments, is a solenoid which receives electrical command control signals from a solenoid controller (not shown) or from a vehicles ECU.

Figure 24:
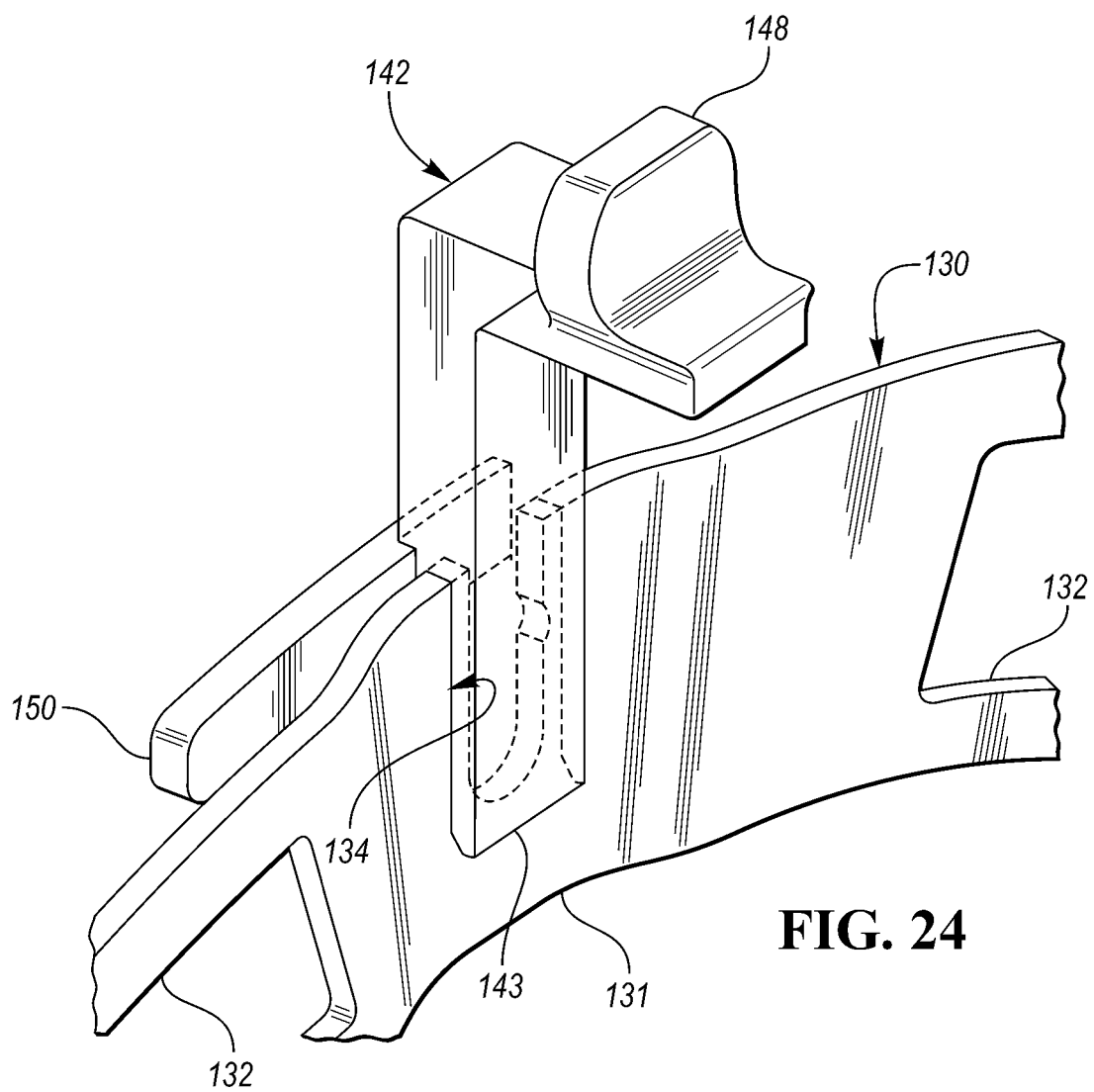
FIG. 24 is an enlarged, top perspective view, partially broken away, of the devices of FIGS. 19 and 20 assembled together to show an axially overlapping relationship of the assembled devices.

Also, preferably, as best shown in FIG. 24, the selector plate 130 has a bent portion 131 so that the detent 150 axially overlaps the selector plate 130 thereby provides extra rigidity to the selector plate 130 at the location of the slot 134.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for controlling operating modes of an over-running coupling assembly including first and second coupling members having first and second coupling faces, respectively, in close-spaced opposition with one another, the first coupling member being mounted for rotation about a rotary axis, the system comprising:

a control member mounted for controlled shifting movement between the coupling faces, wherein the control member has a slot formed therein;

a bi-directional actuator assembly including an output member having a pair of spaced legs projecting therefrom, the output member extending through a slot formed in a wall of the second coupling member and being pivotally connected to the control member for selective, small-displacement, control member shifting movement relative to the second coupling member between a first position which corresponds to a first operating mode of the coupling assembly and a second position which corresponds to a second operating mode of the coupling assembly in response to an actuator command signal;

a one-way locking member integrally formed with the output member for movement between a disengaged position in which the control member is permitted to shift relative to the second coupling member and an engaged position between the control member and a locking member engaging portion of the wall of the second coupling member to lock the control member and the second coupling member together to prevent the control member from inadvertently shifting in a first direction relative to the second coupling member in the absence of the actuator command signal received by the actuator assembly; and wherein the output member is rotatably connected to the control member via a clearance fit connection, the legs of the output member have the clearance fit connection with the slot in the control member and the slot in the control member has a straight edge and an angled edge so that when the locking member is in the disengaged position and the control member begins to inadvertently shift in the first direction in the absence of the actuator command signal received by the actuator assembly the output member rotates within the control member and the locking member rotates with the output member to move from the disengaged position to the engaged position.

2. The system as claimed in claim 1, wherein the control member is a control or selector plate rotatable about the axis between different angular positions.

3. The system as claimed in claim 1, wherein the output member includes an actuator arm.

4. The system as claimed in claim 1, wherein the coupling assembly is a clutch assembly, the coupling members are clutch members and the coupling faces are clutch faces.

5. The system as claimed in claim 4, wherein the clutch assembly is a selectable, one-way clutch assembly and wherein the first clutch member is a notch plate, the second clutch member is a pocket plate and the control member is a selector plate rotatable about the axis.

6. The system as claimed in claim 1, wherein the system is an electromechanical system and wherein the actuator assembly includes an electrically-powered device for driving the control member in response to an electrical actuator command signal.

7. An overrunning coupling and control assembly comprising:

a coupling subassembly including first and second coupling members having first and second coupling faces, respectively, in close-spaced opposition with one another, the first coupling member being mounted for rotation about a rotary axis and the second coupling member including a wall having a slot formed therein and a pawl-engaging portion;

a control member mounted for controlled shifting movement between the coupling faces, wherein the control member has a slot formed therein;

a bi-directional actuator subassembly including an output member having a pair of spaced legs projecting therefrom, the output member extending through the slot formed in the wall of the second coupling member and being pivotally connected to the control member for selective, small-displacement, control member shifting movement relative to the second coupling member between a first position which corresponds to a first operating mode of the coupling subassembly and a second position which corresponds to a second operating mode of the coupling subassembly in response to an actuator command signal;

a one-way locking member integrally formed with the output member for movement between a disengaged position in which the control member is permitted to shift relative to the second coupling member and an engaged position between the control member and the pawl-engaging portion of the wall of the second coupling member to lock the control member and the second coupling member together to prevent the control member from inadvertently shifting in a first direction relative to the second coupling member in the absence of the actuator command signal received by the actuator subassembly; and wherein the output member is rotatably connected to the control member via a clearance fit connection, the legs of the output member have the clearance fit connection with the slot in the control member and the slot in the control member has a straight edge and an angled edge so that when the locking member is in the disengaged position and the control member begins to inadvertently shift in the first direction in the absence of the actuator command signal received by the actuator assembly the output member rotates within the control member and the locking member rotates with the output member to move from the disengaged position to the engaged position.

8. The assembly as claimed in claim 7, wherein the control member is a control or selector plate rotatable about the axis between different angular positions.

9. The assembly as claimed in claim 7, wherein the output member includes an actuator arm.

10. The assembly as claimed in claim 7, wherein the coupling subassembly is a clutch subassembly, the coupling members are clutch members and the coupling faces are clutch faces.

11. The assembly as claimed in claim 7, wherein the actuator subassembly includes an electrically-powered device for driving the control member in response to an electrical actuator command signal.

12. The assembly as claimed in claim 10, wherein the clutch subassembly is a selectable, one-way clutch subassembly and wherein the first clutch member is a notch plate, the second clutch member is a pocket plate and the control member is a selector plate rotatable about the axis.

* * * * *